United States Patent
Volkmer et al.

(10) Patent No.: US 12,512,549 B2
(45) Date of Patent: Dec. 30, 2025

(54) BATTERY UNIT AND MOTOR VEHICLE WITH A BATTERY UNIT

(71) Applicant: Dr. Ing. h.c. F. Porsche Aktiengesellschaft, Stuttgart (DE)

(72) Inventors: Christopher Volkmer, Niefern-Öschelbronn (DE); Philipp Kellner, Renningen (DE); Sascha Mostofi, Stuttgart (DE); Immanuel Vogel, Steinheim (DE); Adrian Starczewski, Korntal-Münchingen (DE); Jan Hogenmüller, Leonberg (DE); Jan Kretzschmar, Stuttgart (DE); Dieter Schiebel, Korntal-Münchingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 654 days.

(21) Appl. No.: 17/847,483

(22) Filed: Jun. 23, 2022

(65) Prior Publication Data

US 2022/0416350 A1    Dec. 29, 2022

(30) Foreign Application Priority Data

Jun. 24, 2021   (DE) ..................... 10 2021 116 324.2

(51) Int. Cl.
*H01M 50/249*   (2021.01)
*H01M 50/204*   (2021.01)
(Continued)

(52) U.S. Cl.
CPC ....... *H01M 50/249* (2021.01); *H01M 50/204* (2021.01); *H01M 50/224* (2021.01);
(Continued)

(58) Field of Classification Search
CPC ............. H01M 50/207; H01M 50/209; H01M 50/224; H01M 50/242; H01M 50/249; H01M 50/271; H01M 50/273
See application file for complete search history.

(56) References Cited

U.S. PATENT DOCUMENTS

2017/0305251 A1* 10/2017 Hara .................... H01M 50/262
2017/0355255 A1* 12/2017 Brausse ............. B62D 25/2036
(Continued)

FOREIGN PATENT DOCUMENTS

CN    209071439 U    7/2019
CN    212011072 U    11/2020
(Continued)

OTHER PUBLICATIONS

Clarivate Analytics machine translation of DE 102019207595 B3 (Year: 2020).*

*Primary Examiner* — Kevin E Yoon
(74) *Attorney, Agent, or Firm* — Buchanan Ingersoll & Rooney PC

(57) ABSTRACT

A battery unit with a battery housing with a base body having an open design at its two opposite end regions. Two battery housing covers are provided which can each be arranged so that they can be connected at one of the two opposite end regions to the base body in order to close the battery housing. At least two battery chambers are provided in the battery housing for the arrangement of battery cells. The base body has, for partitioning the battery chambers, at least one partition wall which extends from an end region of the base body to the other end region of the base body along its longitudinal extent. At least one of the battery housing covers or both battery housing covers has, on its respective side facing the partition wall, an open socket into which a respective partition wall can be inserted.

18 Claims, 3 Drawing Sheets

Figure 1:
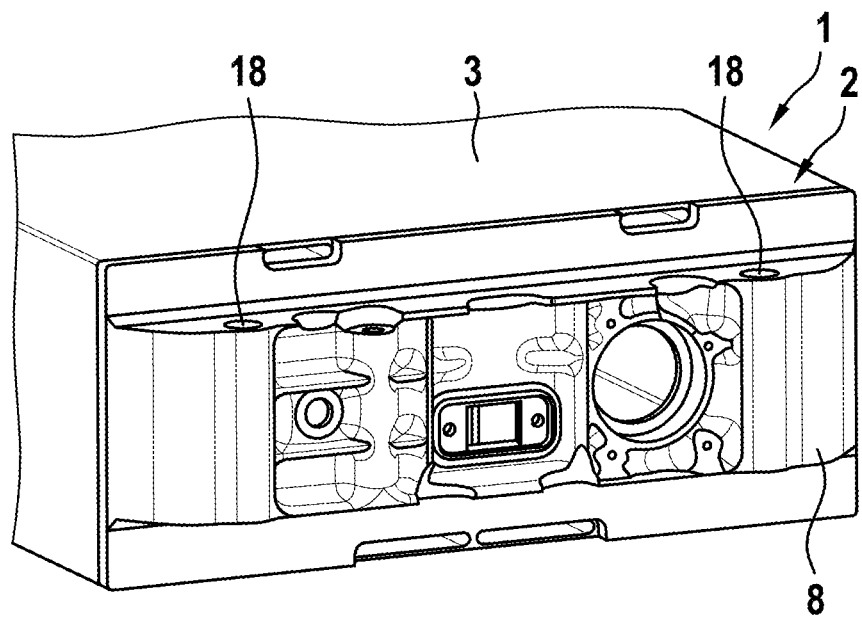

(51) Int. Cl.
  H01M 50/224 (2021.01)
  H01M 50/242 (2021.01)
  H01M 50/271 (2021.01)
  H01M 50/273 (2021.01)
(52) U.S. Cl.
  CPC ....... H01M 50/242 (2021.01); H01M 50/271 (2021.01); H01M 50/273 (2021.01); *H01M 2220/20* (2013.01)

(56) References Cited

U.S. PATENT DOCUMENTS

| | | | |
|---|---|---|---|
| 2018/0050607 A1* | 2/2018 | Matecki | B60L 50/64 |
| 2021/0066684 A1 | 3/2021 | Patscheider | |
| 2023/0095565 A1* | 3/2023 | Lu | H01M 10/6554 |
| | | | 429/159 |

FOREIGN PATENT DOCUMENTS

| | | | | |
|---|---|---|---|---|
| CN | 213071273 U | * | 4/2021 | ......... H01M 50/538 |
| DE | 102015008930 A1 | | 1/2017 | |
| DE | 102018207151 A1 | | 11/2019 | |
| DE | 102018210575 A1 | | 1/2020 | |
| DE | 102019108902 A1 | | 10/2020 | |
| DE | 102019111769 A1 | | 11/2020 | |
| DE | 102019207595 B3 | | 11/2020 | |

* cited by examiner

BATTERY UNIT AND MOTOR VEHICLE WITH A BATTERY UNIT

CROSS-REFERENCE TO RELATED APPLICATION

This application claims priority to German Application No.: 10 2021 116 324.2, filed Jun. 24, 2021, the content of such application being incorporated by reference herein in its entirety.

FIELD OF THE INVENTION

The invention relates to a battery unit, in particular of a motor vehicle, and a motor vehicle with such a battery unit.

BACKGROUND OF THE INVENTION

Battery units of motor vehicles, which have a battery housing with battery cells arranged therein, are known in the prior art. The battery housing here has a base body and a battery housing cover which is placed onto the base body of the battery housing in order to close the battery housing.

In the event of an accident, it may, however, occur that an exerted force is applied to the battery housing cover and the battery housing cover is consequently pressed inward and penetrates the interior of the battery housing. The battery housing can consequently lose its leaktightness such that water or dirt can penetrate and there is also a possibility that at least some of the battery cells are damaged, which can cause a fault and/or a short circuit.

DE 10 2019 111 769 A1, which is incorporated by reference herein, discloses a battery unit with a battery housing with a base body and with battery housing covers which are connected to the base body of the battery housing, wherein the battery housing cover has a deformable region on the side facing away from the base body of the battery housing such that the deformation takes place by force being introduced from outside the battery housing and the battery housing cover does not penetrate the interior of the battery housing. However, this entails a complicated structure which also requires a certain amount of structural space.

SUMMARY OF THE INVENTION

Described herein is a battery unit which has a safe design even when force is exerted from outside, as well as a motor vehicle which is improved in terms of the safety of the battery unit.

An exemplary embodiment of the invention relates to a battery unit with a battery housing with a base body, wherein the base body has an open design at its two opposite end regions, wherein two battery housing covers are provided which can each be arranged so that they can be connected at one of the two opposite end regions to the base body in order to close the battery housing, wherein at least two battery chambers are provided in the battery housing for the arrangement of battery cells, wherein the base body has, for partitioning the battery chambers, at least one partition wall which extends essentially from an end region of the base body to the other end region of the base body along its longitudinal extent, wherein at least one of the battery housing covers or both battery housing covers has, on its respective side facing the partition wall, an open socket into which a respective partition wall is or can be inserted, wherein, in the inserted state, the socket engages over the partition wall in a direction transverse to the longitudinal extent of the partition wall. It is consequently obtained that, in the event of an accident, when force is exerted to the battery housing cover, the battery housing cover is supported against the partition wall in the longitudinal direction of the partition wall, and at the same time the socket supports the partition wall in a transverse direction to the longitudinal direction of the partition wall, such that the partition wall is reinforced and protected against buckling. It is advantageous here if the partition wall already engages in the socket in the normal state, or that, in the event of an accident, the partition wall is inserted into the socket by the exertion of force only by the socket being displaced toward the partition wall.

In a further exemplary embodiment, it is also expedient if a gap is provided between the partition wall and the battery housing cover with its socket in such a way that, in the closed state of the battery housing cover and without force being exerted from outside on the battery housing cover, the partition wall does not engage in the socket. Thermal separation between the partition wall and the socket can thus be achieved during normal operation such that the partition wall is accommodated by the socket and secured against buckling only in the event of an accident.

In a further exemplary embodiment, it is also advantageous if the partition wall and the battery housing cover are arranged relative to each other in such a way that, in the closed state of the battery housing cover and without force being exerted from outside on the battery housing cover, the partition wall engages in the socket. The partition wall can thus also be already accommodated and supported by the socket during normal operation. The penetration of the housing cover when force is exerted can consequently also be reduced.

It is also particularly advantageous if the socket is designed as a groove with two wall regions projecting from the battery housing cover and a groove base arranged therebetween, wherein a frontal end of the partition wall is arranged between the wall regions of the socket in the engaged state. A stable design of the socket is obtained as a result, such that the socket can ensure reliable lateral support, which can reliably prevent the partition wall from buckling when force is exerted, for example in the event of an accident.

In a further exemplary embodiment, it is also expedient if the frontal end of the partition wall bears against the groove base in the engaged state or is spaced apart therefrom. As a result, thermal expansion can also be compensated in the case of an increase in temperature.

It is also advantageous if the battery housing cover forms a protrusion which forms the socket, in particular the projecting wall regions and the groove base arranged therebetween. It is consequently achieved that the socket can have a stable design such that the partition wall can be supported in a stable fashion and the partition wall can be protected in a stable fashion against buckling.

In a further exemplary embodiment, it is expedient if the base body is designed as an extruded profile, in particular one made from metal. The battery housing can consequently be produced more simply and cost-effectively, in particular if the base body is designed as an aluminum extruded profile.

It is particularly advantageous if the battery housing cover is designed as a forged part. A cost-effective but nevertheless stable form can also be achieved as a result such that it should be less easy for the battery housing cover to be pressed in.

In an advantageous exemplary embodiment, it is also expedient if the motor vehicle is designed with a body with laterally arranged sills, wherein the battery unit is arranged between the two sills and/or is connected in each case to one of the sills by means of the respective battery housing cover. A safe arrangement of the battery unit can be achieved as a result.

BRIEF DESCRIPTION OF THE DRAWING FIGURES

Figure 2:
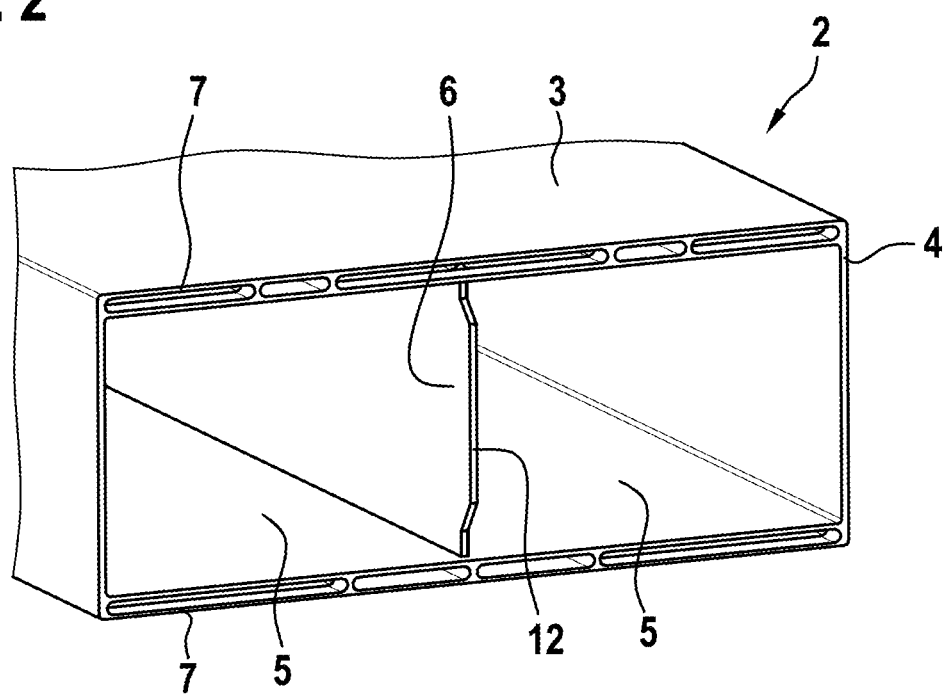
Figure 3:
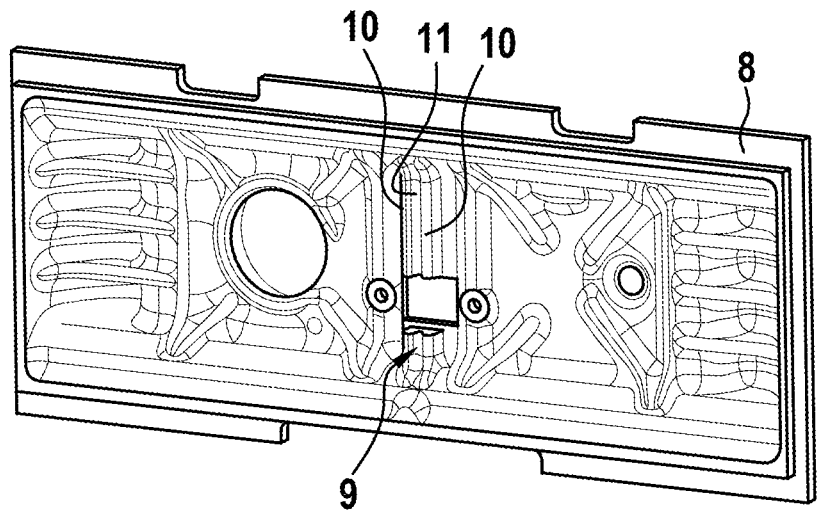
Figure 4:
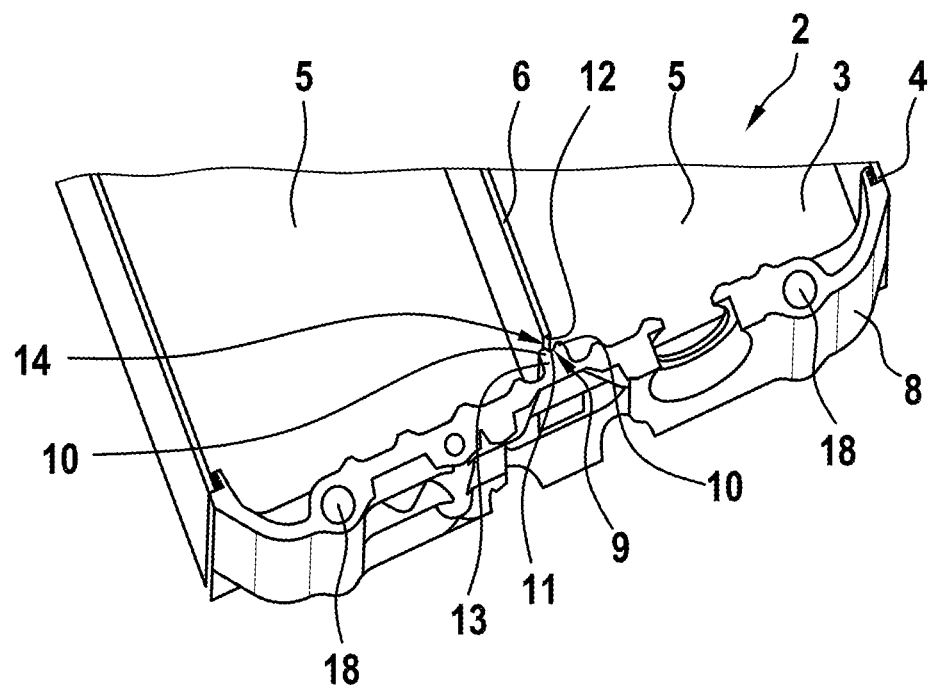
Figure 5:
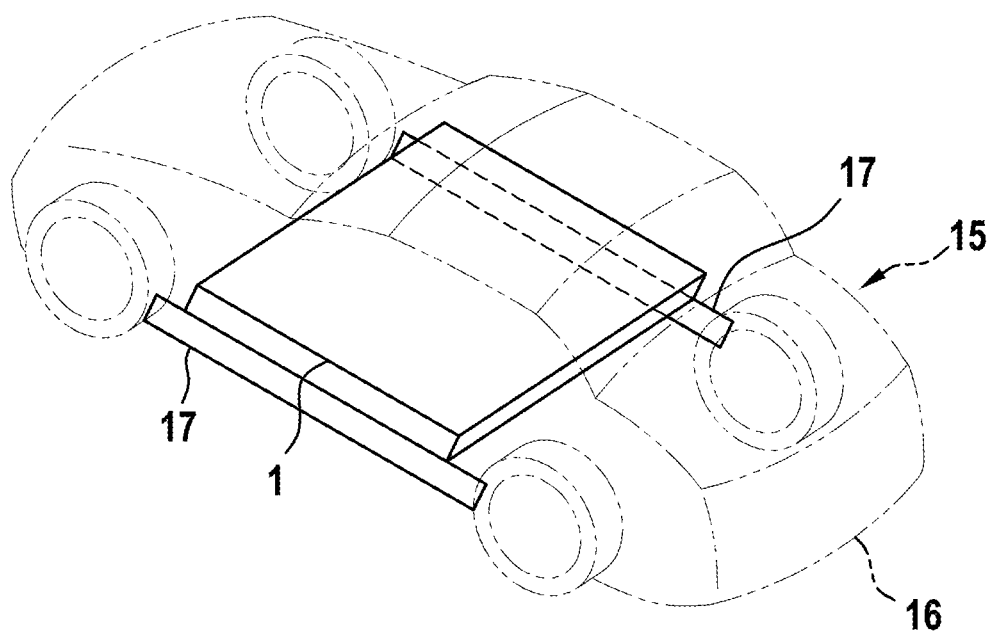

The invention is explained in detail below with the aid of an exemplary embodiment with reference to the drawings, in which:

FIG. 1 shows a schematic perspective view of a battery unit according to aspects of the invention with a battery housing, FIG. 2 shows a schematic perspective view of a base body of the battery housing of the battery unit according to FIG. 1, FIG. 3 shows a schematic perspective view of a battery housing cover of the battery housing of the battery unit according to FIG. 1, FIG. 4 shows a schematic perspective view of the base body with the battery housing cover of the battery housing of the battery unit according to FIG. 1 placed on it, and FIG. 5 shows a schematic view of a motor vehicle with a battery unit according to aspects of the invention.

DETAILED DESCRIPTION OF THE INVENTION

FIGS. 1 to 4 show a battery unit 1 according to aspects of the invention in different schematic views for the purpose of explaining the invention.

The battery unit 1 according to aspects of the invention has a battery housing 2 with a base body 3. Battery cells (not illustrated) are arranged in the battery housing 2, wherein an electronic control unit and/or sensors (which have also not been shown) can optionally also be arranged.

The base body 3 of the battery housing 2 has an open design at its two opposite end regions 4. The base body 3 can here be designed, for example, as an extruded profile, in particular one made from metal. The base body 3 can, by way of example, be produced from aluminum, in particular as an aluminum extruded profile.

According to FIG. 2, the base body 3 has a rectangular design in section and has two battery chambers 5. This embodiment can, however, also have a different design, for example with more than two battery chambers 5 and/or with an alternative cross-section.

The two battery chambers 5 are separated from each other by means of a partition wall 6 which, by way of example, traverses the interior of the base body 3 in its longitudinal direction. The partition wall 6 here also adjoins on both sides a side wall 7 of the base body 3. The partition wall 6 is advantageously designed as a single part with the base body 3. The partition wall 6 can also be connected to the base body 3.

The at least two battery chambers 5 in the battery housing 2 serve in particular for the arrangement of battery cells. For this purpose, in order to partition the battery chambers 5, the base body 3 has at least one partition wall 6 which extends essentially from one end region 4 of the base body 3 to the other end region 4 of the base body 3 along its longitudinal extent.

Furthermore, two battery housing covers 8 are provided at the two end regions 4, in each case one battery housing cover 8 at one end region 4 of the base body 3. The battery housing cover 8 can be placed onto the end region 4 of the base body 3 and fastened to the base body 3 in a leakproof fashion. The battery housing covers 8 can each be arranged so that they can be connected at one of the two opposite end regions 4 to the base body 3 in order to close the battery housing 2.

The at least one partition wall 6 here serves not only to divide the interior of the battery housing 2 but the at least one partition wall 6 also serves for the stability of the battery housing 2 when external forces are exerted.

In order to support the battery housing cover 8 against the partition wall 6 and to support the partition wall 6 against buckling when an external force is exerted, at least one of the battery housing covers 8 or both battery housing covers 8 has an open socket 9 on its respective side facing the partition wall 6. The socket 9 is designed as a groove and configured so that it is open facing the partition wall 6 such that the socket 9 is arranged and designed such that the respective partition wall 6 is or can be inserted into the socket 9, depending on the design of the partition wall 6 and the socket 9. The socket 9 is here designed in such a way that, in the inserted state, the socket 9 engages over the partition wall 6 in a direction transverse to the longitudinal extent of the partition wall 6. The partition wall can consequently be supported laterally by the socket 9, which is intended to impede or prevent buckling of the partition wall 6 in the engaged region of the partition wall 6.

FIGS. 3 and 4 show that the socket 9 has a groove-like design with two wall regions 10 projecting from the battery housing cover 8 and a groove base 11 arranged therebetween.

In the engaged state, the partition wall 6 can therefore be accommodated in the socket 9 in such a way that a frontal end 12 of the partition wall 6 is arranged in the engaged state between the wall regions 10 of the socket 9. If a lateral force is then exerted on the partition wall 6, the partition wall 6 can be supported laterally against the wall regions 10.

In the engaged state, the frontal end 12 of the partition wall 6 can also bear against the groove base 11 or be spaced apart therefrom.

According to FIG. 4, it is particularly advantageous if the battery housing cover 8 forms a protrusion 13 which forms the socket 9, i.e. in particular forms the projecting wall regions 10 and the groove base 11 arranged therebetween.

In an advantageous exemplary embodiment, it is expedient if a gap 14 is provided between the partition wall 6 and the battery housing cover 8 with its socket 9 in such a way that, in the closed state of the battery housing cover 8 and without force being exerted from outside on the battery housing cover 8, the partition wall 6 does not engage in the socket 9 (see FIG. 4). This means that no mechanical connection and also no thermal connection exists or needs to exist between the partition wall 6 and the battery housing cover 8 as long as no external force is exerted on the battery housing cover 8 from outside, which results, for example, from an accident, etc.

In an alternative embodiment, it is also advantageous if the partition wall 6 and the battery housing cover 8 are arranged relative to each other in such a way that, in the closed state of the battery housing cover 8 and without force being exerted from outside on the battery housing cover 8, the partition wall 6 engages in the socket 9.

In order to achieve the required stability of the battery housing cover 8, the latter is advantageously designed as a forged part, in particular one made from metal.

At its frontal end 12, the partition wall 6 can either run in a straight line or be contoured, in particular can be milled. It can be seen from FIG. 2 that the frontal end 12 of the partition wall 6 has a trapezoidal shape in a central region. This can serve to make it easier to insert the partition wall 6 into the socket 9. The frontal end 12 can alternatively also have a different shape.

FIG. 5 shows schematically a motor vehicle 15 with a body 16 with two opposite sills 17. The battery 1 is arranged between the two sills 17, wherein the battery unit 1 can extend from one sill 17 to the other sill 17.

The battery 1 can here be connected in each case to one of the sills 17 by means of the respective battery housing cover 8. For this purpose, retaining means 18 can be provided on the battery housing covers 8.

The design according to aspects of the invention of the socket for accommodating the partition wall 6 supports the partition wall 6 itself and ensures a sufficient stability of the battery housing cover 8 with at the same time a reduction in material.

According to aspects of the invention, one battery housing cover 8 can be designed according to aspects of the invention or it is also possible for both battery housing covers 8 to be designed according to aspects of the invention.

LIST OF REFERENCE NUMERALS

1 Battery unit
2 Battery housing
3 Base body
4 End region
5 Battery chamber
6 Partition wall
7 Side wall
8 Battery housing cover
9 Socket
10 Wall region
11 Groove base
12 End
13 Protrusion
14 Gap
15 Motor vehicle
16 Body
17 Sill
18 Retaining means

What is claimed:

1. A battery unit comprising:
a battery housing with a base body having openings at two opposite end regions,
two battery housing covers which are each configured to be connected to the base body at one of the two opposite end regions in order to close the battery housing,
at least two battery chambers disposed in the battery housing that are each sized for receiving battery cells, wherein the base body has, for partitioning the battery chambers, at least one partition wall which extends along a longitudinal extent from one of the opposite end regions of the base body to the other opposite end region of the base body,
wherein at least one of the battery housing covers or both battery housing covers has, on a respective side facing the partition wall, an open socket into which the partition wall either is inserted or is configured to be inserted,
wherein, in an inserted state of the socket, the socket engages over the partition wall in a direction transverse to the longitudinal extent of the partition wall,
wherein the socket is a groove with two wall regions projecting from an interior facing surface of the battery housing cover and a groove base arranged therebetween, wherein a frontal end of the partition wall is arranged between the wall regions of the socket in the inserted state, and wherein the interior facing surface directly faces the at least two battery chambers, and wherein the two wall regions project beyond the interior facing surface of the battery housing cover in a direction toward the at least two battery chambers, wherein at least one of the battery housing covers or both battery housing covers has a shoulder extending along a perimeter thereof for mating with a perimeter of the opening at one of the two opposite end regions of the base body, and wherein for the at least one of the battery housing covers or both battery housing covers, the housing cover includes a depression that is surrounded by the shoulder, and wherein the two wall regions project outwardly from the depression.

2. The battery unit as claimed in claim 1, wherein the partition wall and the battery housing cover are arranged relative to each other such that in a closed state of the battery housing cover, and without force being exerted from outside on the battery housing cover, the partition wall engages in the socket.

3. The battery unit as claimed in claim 1, wherein the frontal end of the partition wall bears against the groove base in the inserted state.

4. The battery unit as claimed in claim 1, wherein the base body is an extruded profile that is composed of metal.

5. The battery unit as claimed in claim 1, wherein the battery housing cover is a forged part.

6. The battery unit as claimed in claim 1, wherein the at least one of the battery housing covers has retaining means formed directly thereon for connecting to a sill of a motor vehicle.

7. The battery unit as claimed in claim 1, wherein the two wall regions and the groove are rounded, as viewed in cross-section.

8. The battery unit as claimed in claim 1, wherein the two wall regions are interrupted by an opening formed in the battery housing cover.

9. The battery unit as claimed in claim 1, wherein at least one of the battery housing covers or both battery housing covers has a wall thickness defined between the interior facing wall and an exterior facing wall of the battery housing cover.

10. The battery unit as claimed in claim 1, wherein for the at least one of the battery housing covers or both battery housing covers, the two wall regions are disposed between the shoulder at a top end of the housing cover and the shoulder at a bottom end of the housing cover.

11. The battery unit as claimed in claim 10, wherein for the at least one of the battery housing covers or both battery housing covers, an upper end of the two wall regions is separated and spaced apart from the shoulder at the top end of the housing cover and a lower end of the two wall regions is separated and spaced apart from the shoulder at the bottom end of the housing cover.

12. The battery unit as claimed in claim 1, wherein each wall region includes a medial surface that faces the partition wall and a lateral surface opposite the medial surface that faces a side wall of the battery housing.

13. A motor vehicle comprising the battery unit as claimed in claim 1.

14. The motor vehicle as claimed in claim 13, the motor vehicle comprising a body having laterally arranged sills, wherein the battery unit is arranged between the sills and/or is connected to one of the sills by one of the battery housing covers.

15. The motor vehicle as claimed in claim 14, wherein the at least one of the battery housing covers has, on a respective side facing one of the sills, retaining means formed directly thereon for connecting to said one of the sills.

16. The motor vehicle as claimed in claim 15, wherein the retaining means comprises an opening.

17. The motor vehicle as claimed in claim 15, wherein the retaining means comprises two openings, and wherein the groove is positioned between the openings.

18. The motor vehicle as claimed in claim 15, wherein the opening and the groove extend parallel with respect to each other.

* * * * *